J. M. McCULLOCH.
COOKING UTENSIL.
APPLICATION FILED MAR. 13, 1916.
1,205,461.
Patented Nov. 21, 1916.
2 SHEETS—SHEET 2.
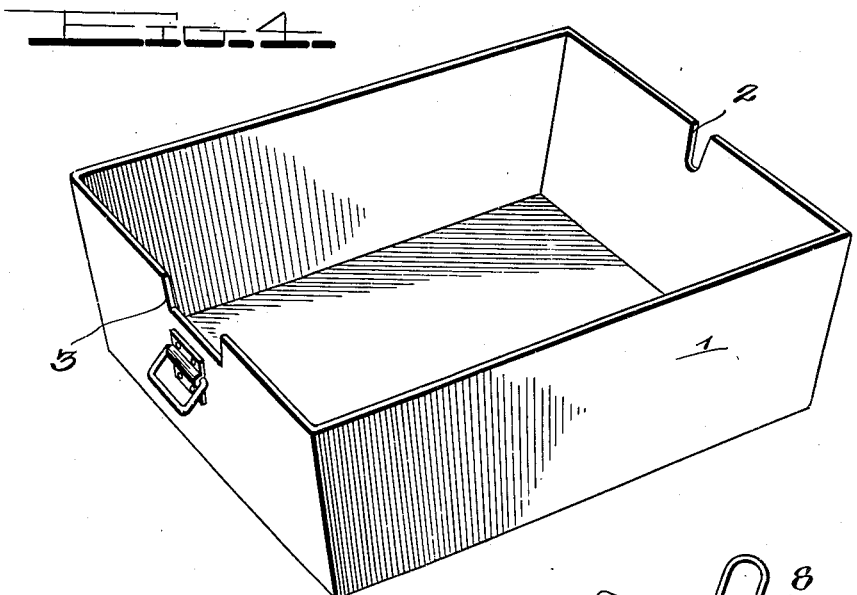
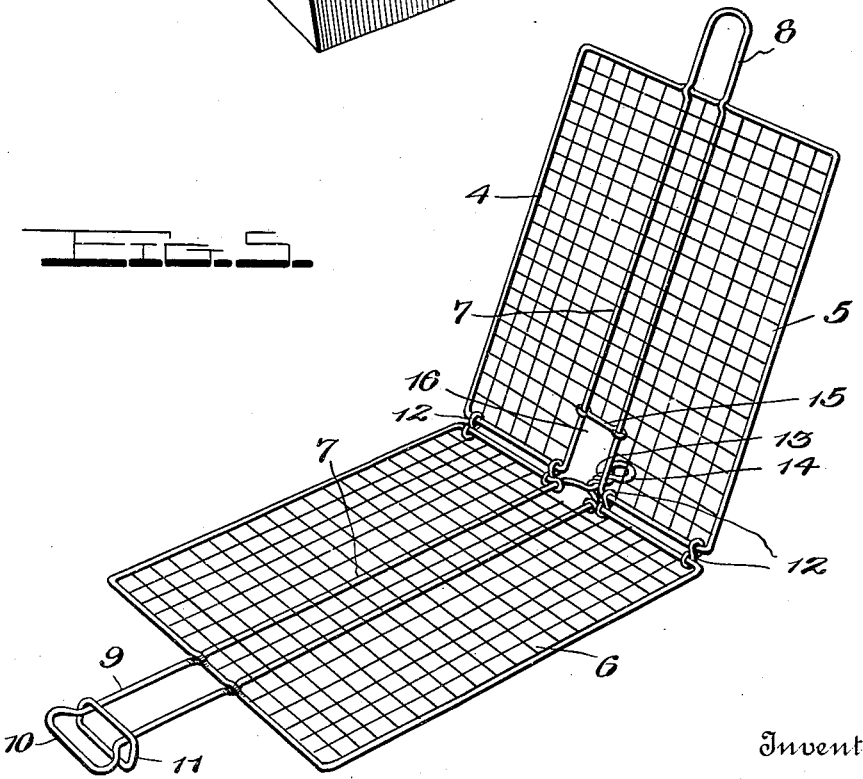
Inventor
J. M. McCulloch,
Witnesses

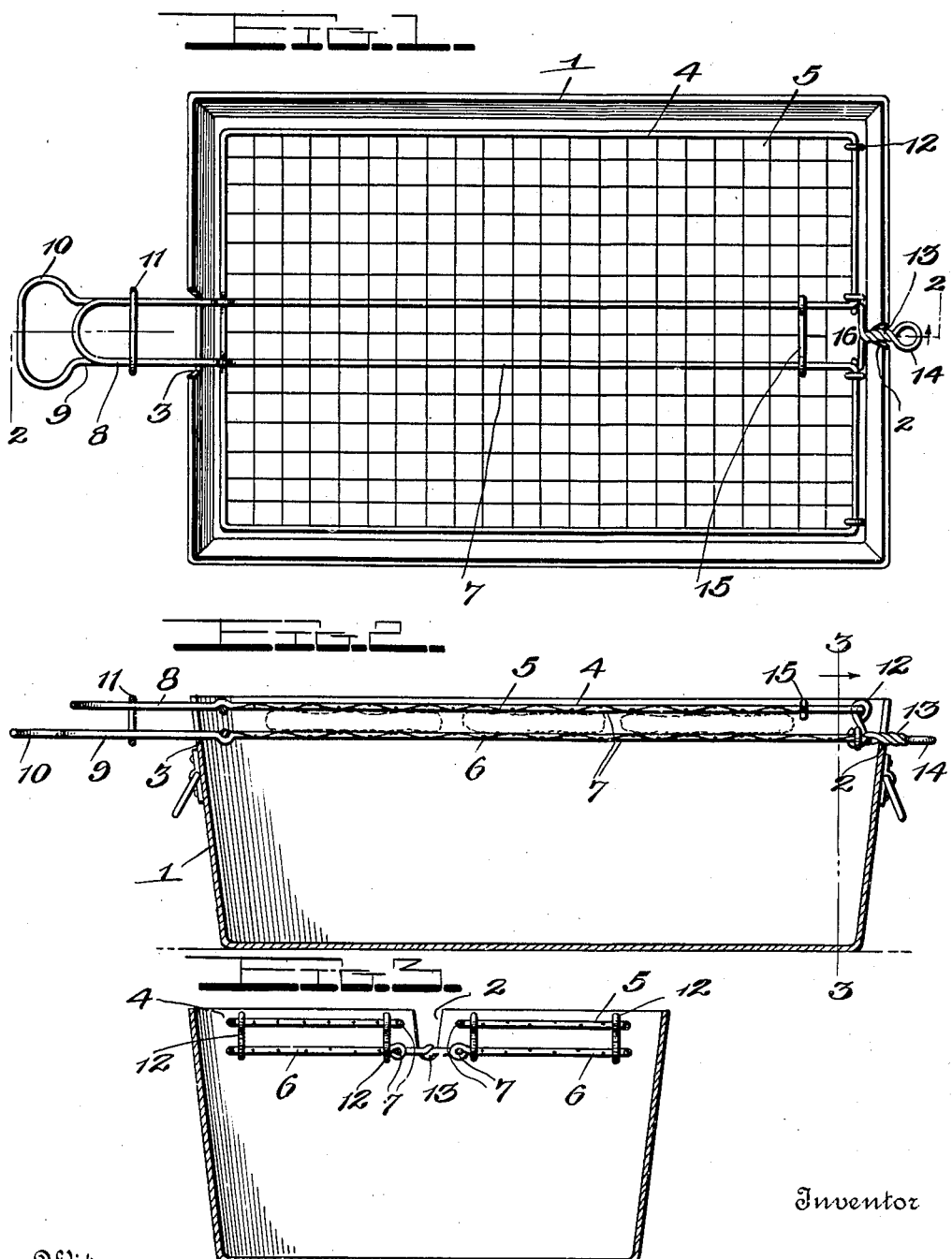

UNITED STATES PATENT OFFICE.

JOSIE M. McCULLOCH, OF CHULA VISTA, CALIFORNIA.

COOKING UTENSIL.

1,205,461.  Specification of Letters Patent.  Patented Nov. 21, 1916.

Application filed March 13, 1916. Serial No. 83,973.

*To all whom it may concern:*

Be it known that I, JOSIE M. MCCULLOCH, a citizen of the United States, residing at Chula Vista, in the county of San Diego and State of California, have invented certain new and useful Improvements in Cooking Utensils; and I do declare the following to be a full, clear, and exact description of the invention, such as will enable others skilled in the art to which it appertains to make and use the same.

This invention relates generally to cooking utensils, and more particularly to certain new and useful improvements in broilers.

The object of the invention is to provide a broiler of simple, cheap and durable construction, and one which will be well adapted for the purpose for which it is designed.

With this and other objects in view, the invention consists of certain novel features of construction, and the combination and arrangement of parts as will be hereinafter fully described and claimed.

In the accompanying drawings, forming a part of the specification, and in which similar reference characters designate like parts throughout the several views, Figure 1 is a top plan view of a broiler constructed in accordance with this invention; Fig. 2 is a central longitudinal sectional view taken on the line 2—2 of Fig. 1; Fig. 3 is a transverse sectional view taken on the plane of the line 3—3 of Fig. 2; Fig. 4 is a perspective view of a drip pan of the broiler; and Fig. 5 is a similar view of the gridiron thereof, showing the same in its opened position.

Referring more particularly to the drawings, the reference numeral 1 designates the rectangular receptacle or drip pan of this improved broiler. The upper edge of the rear end of the pan 1 is provided midway of its width with an upright substantially V-shaped notch 2, while the upper edge of the front end of the pan is similarly provided with a substantially rectangular upright notch 3.

Arranged within the pan 1 is a gridiron 4, the latter being composed of a pair of rectangular wire sections 5 and 6, as most clearly seen in Fig. 5 of the drawings. These sections 5 and 6 are composed of rectangular frames made of heavy metal wire, and arranged between the wires of the frames are longitudinally and transversely extending wires of smaller size than the frame wires. Extending longitudinally across the intermediate portions of the sections 5 and 6 are pairs of parallel wires 7, the latter being extended beyond the plane of one of the ends of said sections and integrally connected to provide suitable handle members 8 and 9. The handle member 9 is provided with an enlarged end 10 to prevent the keeper 11 from becoming displaced, said keeper 11 being slidable on the handle member 9 and adapted to surround the other handle member 8 to retain the sections 5 and 6 in their locked positions. Any other equivalent locking member can be substituted for the keeper 11 to hold the sections 5 and 6 in their relatively closed positions. The sections 5 and 6 are pivotally connected at their free ends by suitable S-shaped links 12.

The parallel wires 7 of the gridiron section 6 at the pivoted end thereof are brought together and twisted to provide a suitable tang 13, the free end of which is provided with an eye 14, the purpose of which will be hereinafter described. Extending between the parallel wires 7 of the other gridiron section 5 at a point spaced inwardly from the pivoted end of said section is a short transverse wire 15. This arrangement provides a notch 16 in the pivoted end of the section 5 through which the aforesaid tang 13 may be passed transversely when the sections 5 and 6 are being reversed, as will be readily understood without further description.

In use, meat or other food to be broiled is placed in the gridiron 4 which is placed in the pan 1, the tang 13 being received in the aforesaid V-shaped notch 2, and the handle members 8 and 9 being similarly received in the rectangular notch 3. Owing to the fact that these handle members are substantially flat, the gridiron will be necessarily retained in a substantially horizontal position. When it is desired to turn the gridiron, the handle of the same is grasped and raised a slight amount in order that it may be revolved, the tang 13 being so mounted in the notch 2. The aforesaid eye 14 comprises in effect a stop member for preventing the tang from sliding longitudinally out of the notch 2 when the gridiron is being turned or raised. Owing to the fact that the tang may pass through the notch 16, it will be understood that the sections 5 and 6 of the gridiron may be reversed, as may be found to be very convenient.

From the foregoing description, taken in connection with the accompanying drawings, the operation and advantages of the invention will be readily understood without a more extended explanation. It is to be understood, however, that the drawings are merely illustrative of the invention, and as various changes in form and proportion and in the minor details of construction may be resorted to without departing from the principle of the invention, I do not wish to be limited to this construction other than that set forth in the appended claim.

I claim:—

A gridiron of the class described comprising a pair of rectangular wire sections pivotally connected at one of their ends, handle members extending from the other ends of said sections, a locking member for retaining said sections in their relative closed positions, and a tang arranged at the pivoted end of one of said sections midway of the width thereof, the pivoted end of the other section being notched inwardly midway of the width thereof to allow said tang to swing transversely through the same when said sections are being reversed.

In testimony whereof I have hereunto set my hand in presence of two subscribing witnesses.

JOSIE M. McCULLOCH.

Witnesses:
WARNER EDMONDS,
ALAN D. ARMITAGE.